United States Patent
Steppan et al.

(10) Patent No.: US 9,272,337 B2
(45) Date of Patent: Mar. 1, 2016

(54) SYSTEM AND METHOD FOR FORMING A BORE IN A WORKPIECE

(75) Inventors: Joern Steppan, Celle (DE); Christian Marten, Hannover (DE); Christoph Wangenheim, Hannover (DE); Rocco Eisseler, Sr., Stuttgart (DE)

(73) Assignee: Baker Hughes Incorporated, Houston, TX (US)

( * ) Notice: Subject to any disclaimer, the term of this patent is extended or adjusted under 35 U.S.C. 154(b) by 520 days.

(21) Appl. No.: 13/588,792

(22) Filed: Aug. 17, 2012

(65) Prior Publication Data

US 2014/0050543 A1    Feb. 20, 2014

(51) Int. Cl.
| | |
|---|---|
| *B23Q 15/14* | (2006.01) |
| *B23B 41/02* | (2006.01) |
| *B23B 35/00* | (2006.01) |
| *B23Q 15/00* | (2006.01) |

(52) U.S. Cl.
CPC ............... *B23B 35/00* (2013.01); *B23B 41/02* (2013.01); *B23B 2260/108* (2013.01); *B23B 2260/128* (2013.01); *B23Q 15/00* (2013.01); *B23Q 15/14* (2013.01); *Y10T 408/03* (2015.01); *Y10T 408/16* (2015.01); *Y10T 408/175* (2015.01)

(58) Field of Classification Search
CPC .... B23Q 15/007; B23Q 15/013; B23Q 15/14; B23Q 15/18; B23Q 2017/001; B23Q 17/22; B23Q 17/2233; B23Q 17/2275; B23Q 17/2266; B23B 41/02; E21B 7/04–7/10; Y10T 408/03; Y10T 408/16; Y10T 408/175; Y10T 408/17; Y10T 408/172; Y10T 408/173
USPC .......... 408/1 R, 8, 13, 10, 11, 12; 175/40, 45, 175/46, 50
See application file for complete search history.

(56) References Cited

U.S. PATENT DOCUMENTS

| | | | | |
|---|---|---|---|---|
| 4,739,841 A | * | 4/1988 | Das .................................. | 175/61 |
| 7,044,690 B1 | * | 5/2006 | Charvat ......................... | 408/1 R |
| 7,824,135 B2 | | 11/2010 | Radkowitsch et al. | |
| 2008/0267726 A1 | * | 10/2008 | Masuda ......................... | 408/230 |

(Continued)

FOREIGN PATENT DOCUMENTS

| | | |
|---|---|---|
| DE | 202005001450 U1 | 5/2005 |
| DE | 102006000743 A1 | 7/2007 |

(Continued)

OTHER PUBLICATIONS

Nuclear Options, MWP Advanced Manufacturing, Gale Group Trade & Industry DB, Mar. 16, 2012, vol. 48, Gale/Cengage. http://www.dialogweb.com;cgi/dwclient?req=1345475316280.
Application Notes, Measuring Wall Thickness of Gun Drilled Metal, Jul. 23, 2012. http://www.olympus-ims.com/en/application/thickness-gun-drilled-metal/.

*Primary Examiner* — Daniel Howell
*Assistant Examiner* — Nicole N Ramos
(74) *Attorney, Agent, or Firm* — Bracewell & Giuliani LLP (57) ABSTRACT

A method of forming a bore through a workpiece with a drill by monitoring drill orientation and bore position; and adjusting drill path as necessary. Adjusted the drill path includes selectively applying an axial impulse to the drill when the drill is in a designated azimuthal orientation. Drill orientation and bore position are monitored with an acoustic transmitter and receiver disposed adjacent an outer surface of the workpiece. The acoustic transmitter and receiver are moved at the same rate at which the drill axially progress through the workpiece, so that they are aligned with the bottom of the bore.

18 Claims, 5 Drawing Sheets

(56) References Cited

U.S. PATENT DOCUMENTS

| | | | |
|---|---|---|---|
| 2009/0148247 A1* | 6/2009 | Nomura | 408/59 |
| 2010/0139981 A1* | 6/2010 | Meister et al. | 175/61 |
| 2011/0031015 A1* | 2/2011 | Downton et al. | 175/27 |
| 2011/0155467 A1* | 6/2011 | Gibb et al. | 175/61 |
| 2012/0170988 A1 | 7/2012 | Kountanya et al. | |

FOREIGN PATENT DOCUMENTS

| | | |
|---|---|---|
| JP | 6-71047 U | 10/1994 |
| JP | 8-71823 A | 3/1996 |
| KR | 20100045659 A | 5/2010 |
| WO | WO 2010051938 A1 * | 5/2010 |

* cited by examiner

SYSTEM AND METHOD FOR FORMING A BORE IN A WORKPIECE

BACKGROUND

1. Field of Invention

The invention relates generally to a method for boring through a workpiece. More specifically, the present invention relates to a method of using a gun drill to form a bore in a workpiece, and steering the drill while boring.

2. Description of Prior Art

Elongated bores formed in manufactured articles are typically formed with an elongate drill. One such type of drill is a gun drill that is cylindrical and is fluted along a portion of its length. The cutting edge of a gun drill is generally at a forward end of the flute. Some gun drills have a cutting edge with a V-shaped edge. However, due to many variables, conventional gun drilling has centerline deviations that are not predictable in direction. Due to their shapes, gun drills often have an eccentric second moment of inertia. Moreover, gun drills usually flex, bend, and twist easily, due at least in part to their high length/diameter rations (l/d>100). During the machining process in metal the cutting speed and the feed rate lead to torsion oscillations and twisting. Consequences of deviations in bore centerline are exacerbated when multiple bores are being formed in a particular workpiece.

SUMMARY OF THE INVENTION

Disclosed herein is an example of a method of drilling through a workpiece and readjusting a path of the drill to remain along a projected path. In one example, a method of controlling a rotating drill in a bore in a workpiece is disclosed that involves urging a drill head of the drill against the workpiece to bore through the workpiece, monitoring an azimuthal orientation of the drill head in a bottom of the bore, and monitoring a distance between a wall of the bore and an outer surface of the workpiece to define a measured distance. In this example the method further includes obtaining an offset distance by comparing the measured distance with a designated distance and altering a path of the drill through the workpiece by applying an impulse force axially onto the drill at a time when the drill head is in a designated azimuth. In this example the offset distance can remain within a tolerance value. In one example, the step of monitoring azimuthal orientation includes measuring an acoustic signal generated by the drill head in the bore over time. Optionally, the step of applying an impulse force includes providing a piezo-electric stack that is axially coupled to the drill, and energizing the piezo-electric stack. The method can further include monitoring the azimuthal orientation of the drill at a location outside of the bore to define an outside azimuth, comparing the outside azimuth to the azimuthal orientation of the drill head in a bottom of the bore, and determining a twisting of the drill based on the comparison. The step of monitoring the distance between the bore and outer surface of the workpiece can involve emitting an acoustic signal at an axial location in the workpiece that substantially coincides with the bottom of the bore, and at varying peripheral sensor positions on the workpiece so that the acoustic signal travels a minimum distance through the workpiece to the bore. In an optional example, the monitoring are performed at frequency greater than a rotational frequency of the drill. Yet further optionally, an electrical discharge machine can be used to form a pilot bore in the workpiece.

In an alternative, disclosed is an optional method that includes controlling a drill in a workpiece. In this example, the drill is rotated in a bore in the workpiece to deepen the bore. An azimuthal orientation of a portion of the drill proximate a bottom of the bore is monitored and a projected path of the bore in the workpiece is estimated. Based on these steps, a direction of the drill through the workpiece is adjusted by applying an axial force onto the drill. In this example, the step of monitoring the azimuth of the drill includes monitoring an acoustic signal generated by a tip of the drill in the workpiece and creating a plot of the signal over time. A magnitude of the signal can vary with respect to azimuthal angle of the tip of the drill. The method can further include monitoring a centerline location of the bore, and wherein the step of adjusting direction of the drill is further based on the monitored centerline location. Optionally, an acoustic transmitter and receiver may be provided adjacent an outer surface of the workpiece, and the transmitter and receiver can be maintained at an axial location of the workpiece that corresponds to an axial location of a bottom of the bore. The transmitter and receiver can further be vertically reciprocated along a portion of the periphery of the workpiece. An azimuthal orientation of the drill adjacent an opening of the bore can be monitored, and this can be used to determine an axial twisting of the drill.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

Figure 1:
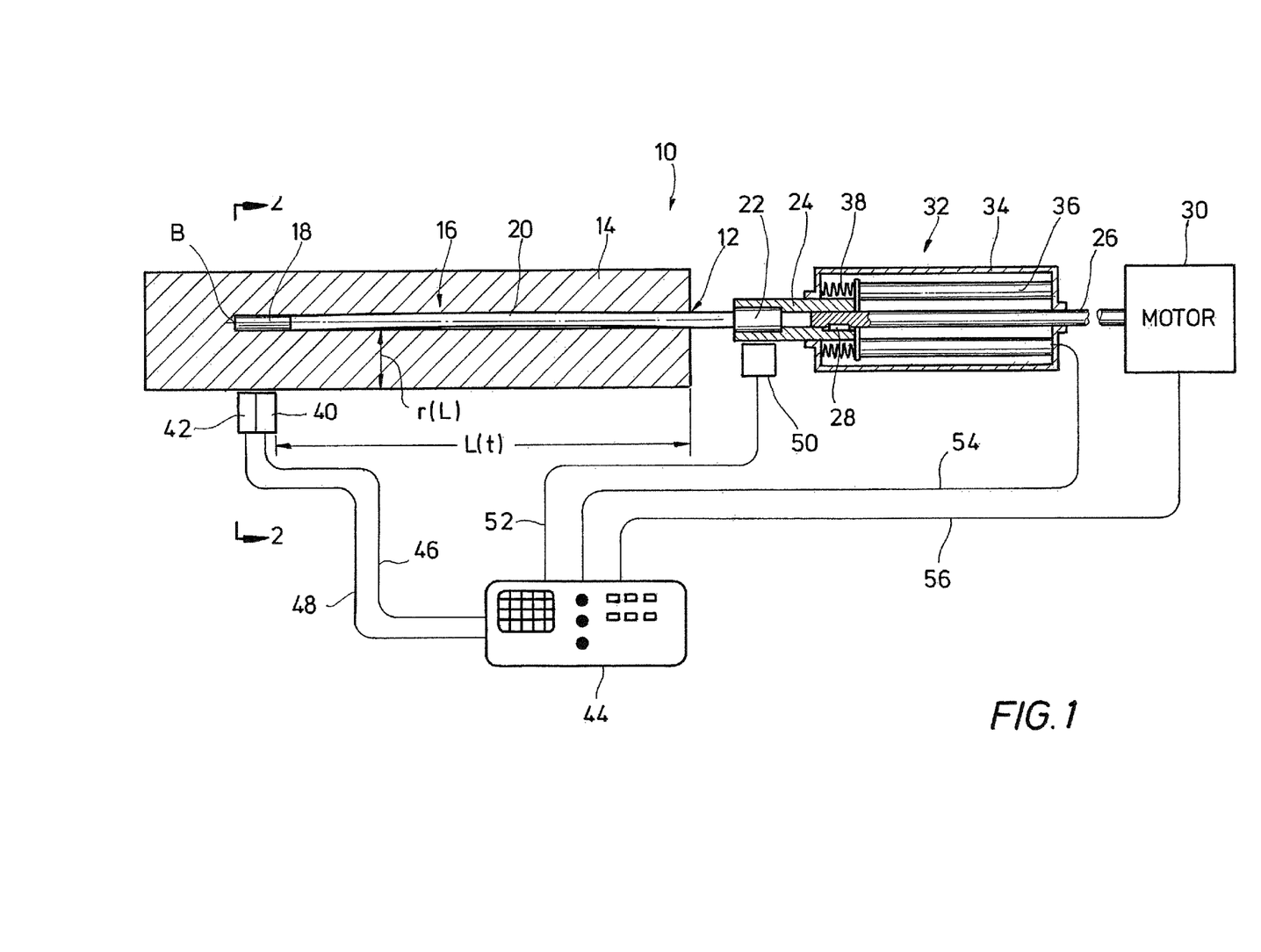
FIG. 1 is a side schematic view of an example embodiment of a drilling system in accordance with the present invention.

Schematically illustrated in FIG. 1 is an example of a drilling system 10 used for creating elongated bore 12 through a workpiece 14. As shown, the bore 12 is formed by axially forcing a rotating drill 16 into the workpiece 14. In one example, the drill 16 is what is known as a gun drill and may have a fluted portion along a portion of its length and a cutting edge on a forward end provided in a V shaped notch. Exemplary drills may be obtained from Botek, Langenfeldstrasse 4, Riederich, Germany. The free end of the drill 16 is shown in the bottom of the bore 12, which is made up of a drill head 18 that is attached on an end of a drill tube 20. In the example of FIG. 1, the drill head 18 and drill tube 20 are each substantially elongate members, where the end of the drill tube 20 opposite drill head 18 connects to a driver 22. The driver 22, which has a diameter greater than the drill tube 20, is shown mounted within a drill chuck 24. Axial and rotational forces transmit through the chuck 24 onto the drill 16 for forming the bore 12. The chuck 24 in turn is driven by a shaft 26 that is axially movable with respect to the chuck 24 but rotationally affixed thereto with a key 28, so that by rotating the shaft 26 the chuck 24 in turn will also rotate. The shaft 26 is shown connected to a drill motor 30 which provides rotational force for the shaft 26, chuck 24, and drill 16.

An optional pulsation device 32 is illustrated set between the drill motor 30 and drill 16 and having a substantially cylindrical housing 34. Housing 34 covers the intersection between the chuck 24 and shaft 26, and the chuck 24 projects axially outward from one side of the housing 34. Actuators 36 are shown set within the housing 34 that each have one end affixed in a rearward side of the housing 34 distal from the chuck 24. Opposing ends of the actuators 36 are depicted in mechanical cooperation with an end of the chuck 24 inside of the housing 34 and distal from the driver 22. Springs 38 are shown adjacent the chuck 34 for exerting a biasing force on the chuck 24 towards the motor 30. As will be described in more detail below, actuators 36 can selectively impart an axial force on to the drill 16.

An acoustic transmitter 40 and receiver 42 are shown adjacent an outer surface of the workpiece 14 and aligned with a bottom end of the bore 12. As will be discussed in more detail below, the transmitter 40 and receiver 42 may be moved axially along the length of the workpiece 14 at a rate substantially the same as a feed rate of the drill 16 through the workpiece 14. Moving the transmitter 40 and receiver 42 at substantially the same rate as the feed rate of the drill 16, retains the transmitter 40, receiver 42, and the tip of the drill 16 at generally the same axial location along the work piece 12. Thus in the example of FIG. 1, the transmitter 40, receiver 42, and the tip of the drill 16, are kept at about the same distance L from the end of the workpiece 14 intersected by the bore 12.

Still referring to FIG. 1, a processor 44 is illustrated in communication with the transducer 40 and receiver 42 via respective leads 46, 48 connected between the processor 44 and transducer 40 and receiver 42. A sensor 50 is shown set adjacent chuck 24, and in an example, is used for monitoring rotation of the chuck 24 and driver 22, so that orientation of the driver 22 can be tracked when rotated. Additional leads 52, 54, 56 are shown connected to the processor 44 that provide communication between the processor 44 and sensor 50, actuator 36, and motor 30 respectively. In one example, the processor 44 operates as a controller for monitoring signals received by the receiver 42 and sensor 50, and for providing command signals to the transmitter 40, actuator 36, and motor 30.

Figure 2:
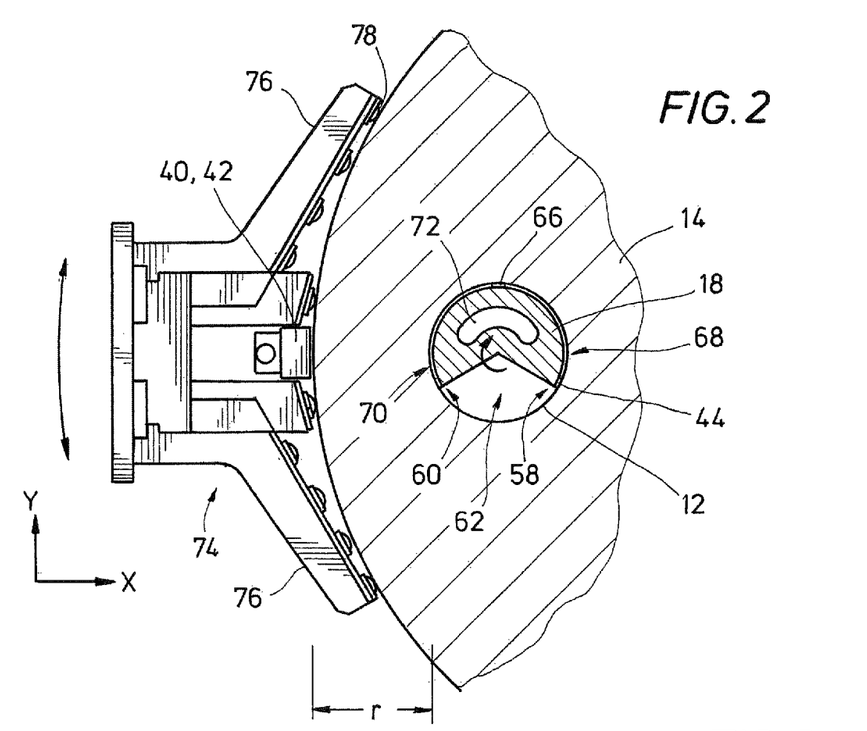
FIGS. 2 and 2A are axial sectional views of a gun drill in a workpiece in accordance with the present invention.

Referring now to FIG. 2, an axial view is shown of the drill head 18 forming the bore 12 through a portion of the workpiece 14 and taken along lines 2-2 of FIG. 1. In this example, an elongated flute is formed axially along an outer surface of the drill head 18 that defines a V shaped slot in its cross section; where the periphery of the drill head 18 intersects with the fluted portion defines a cutting edge 58. On a side of the fluted portion opposite the cutting edge 58 is a trailing edge 60; an opening 62 between the cutting edge 58 and trailing edge 60 coincides with the fluted portion. A guide bar 64 is shown provided on an outer periphery of the drill head 18 and adjacent the cutting surface 58. Another guide bar 66 is shown spaced circumferentially apart from guide bar 64 thereby defining a groove 68 therebetween. Guide bars 64, 66 are formed by deposits of added material on the outer periphery of the drill head 18. Guide bar 66 terminates at a circumferential location angularly spaced away from the trailing edge 60 thereby defining another groove 70 circumferentially spaced apart from groove 68. Further illustrated in FIG. 2 is a cooling channel 72, which can be a kidney shaped open space that extends axially through the drill 16 (FIG. 1) and is for flowing a cooling fluid through the drill 16 to prevent over heating when in use.

In the example of FIG. 2, the transmitter 40 and receiver 42 are set within a transducer assembly 74 which includes a pair of upwardly and lower projecting arms 76 that extend from a mid-point of the assembly 74 into a portion of the outer circumference of the workpiece 14. On sides of the arms 76 facing the workpiece 14, pads 78 are provided that may enhance engaging the assembly 74 with workpiece 14. In one example of use of the drilling system 10 described herein, an acoustic signal is generated by transmitter 40 that is emitted into the workpiece 14 and travels to a wall of the bore 12; a portion of the signal reflects from an interface between the material of the workpiece 14 and fluid within the bore 12, and back towards receiver 42. Fluid within the bore 12 may be air or cooling fluid that flows through the coolant channel 72, which in one example, exits the channel 72 at the tip of the drill 16 and washes cuttings along the fluted surface and away from the cutting surface. Accordingly, by axially urging the transmitter 40 and receiver 42 along the length of the workpiece 14 and at a rate consistent with the axial feed of the drill 15 through the workpiece 14, a distance r between the wall of the workpiece 14 and wall of the bore 12 can be measured to ensure the bore 12 is extending along a designated path through the workpiece 14. Referring back to FIG. 1, as shown a distance r(L) between the outer periphery of the workpiece 14 and wall of the bore 12 can vary along the length of the workpiece 14 due to the flexure of the drill 16.

Figure 2A:
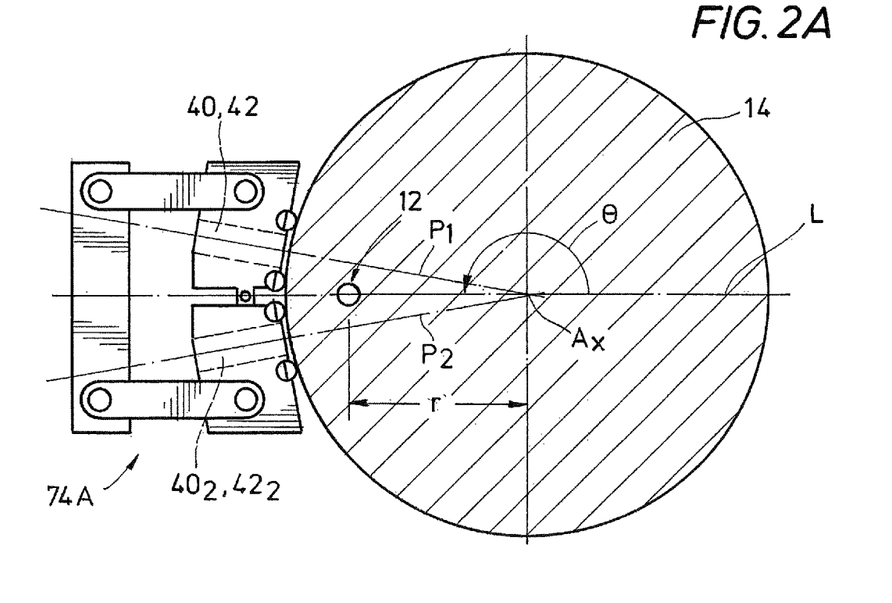

It should be pointed out that the present disclosure includes example embodiments having multiple transmitters 40 and/or receivers 42. For example, shown in an axial sectional view in FIG. 2A, are transmitters $40_1$, $40_2$ and receivers $42_1$, $42_2$ included with an alternate example of a transducer assembly 74A set adjacent workpiece 14. In this example, transmitter $40_1$ is set apart from transmitter $40_2$ and receiver $42_1$ is set apart from receiver $42_2$. In the embodiment of FIG. 2A, bore 12 location can be identified in polar coordinates r, θ with respect to axis $A_X$. In an example, an acoustic signal from transmitter $40_1$ generally follows path $P_1$ and an acoustic signal from transmitter $40_2$ generally follows path $P_2$. Because embodiments exist where at least a portion of the bore 12 can be offset from its position of FIG. 2A, e.g. at a distance from axis $A_X$ other than r, and at an angle from line L other than 0; transmitting and monitoring acoustic signals with spaced apart transmitters and receivers provides an alternate way of identifying the location of the bore 12. Knowing the respective positions of the transmitters $40_1$, $40_2$ and receivers $42_1$, $42_2$, the real time location of the bore 12 can be determined by an analysis of the acoustic signals. Triangulation is one example of analyzing the acoustic signals to determine location of the bore 12. Referring back to FIG. 2, as illustrated by the curved double headed arrow, the transducer assembly 74 can be reciprocated along a circumference of the workpiece 14 so that acoustic signals can be sent and received at different angles with respect to the axis $A_X$ (FIG. 2A) to identify a real time position of the bore 12.

Figure 3:
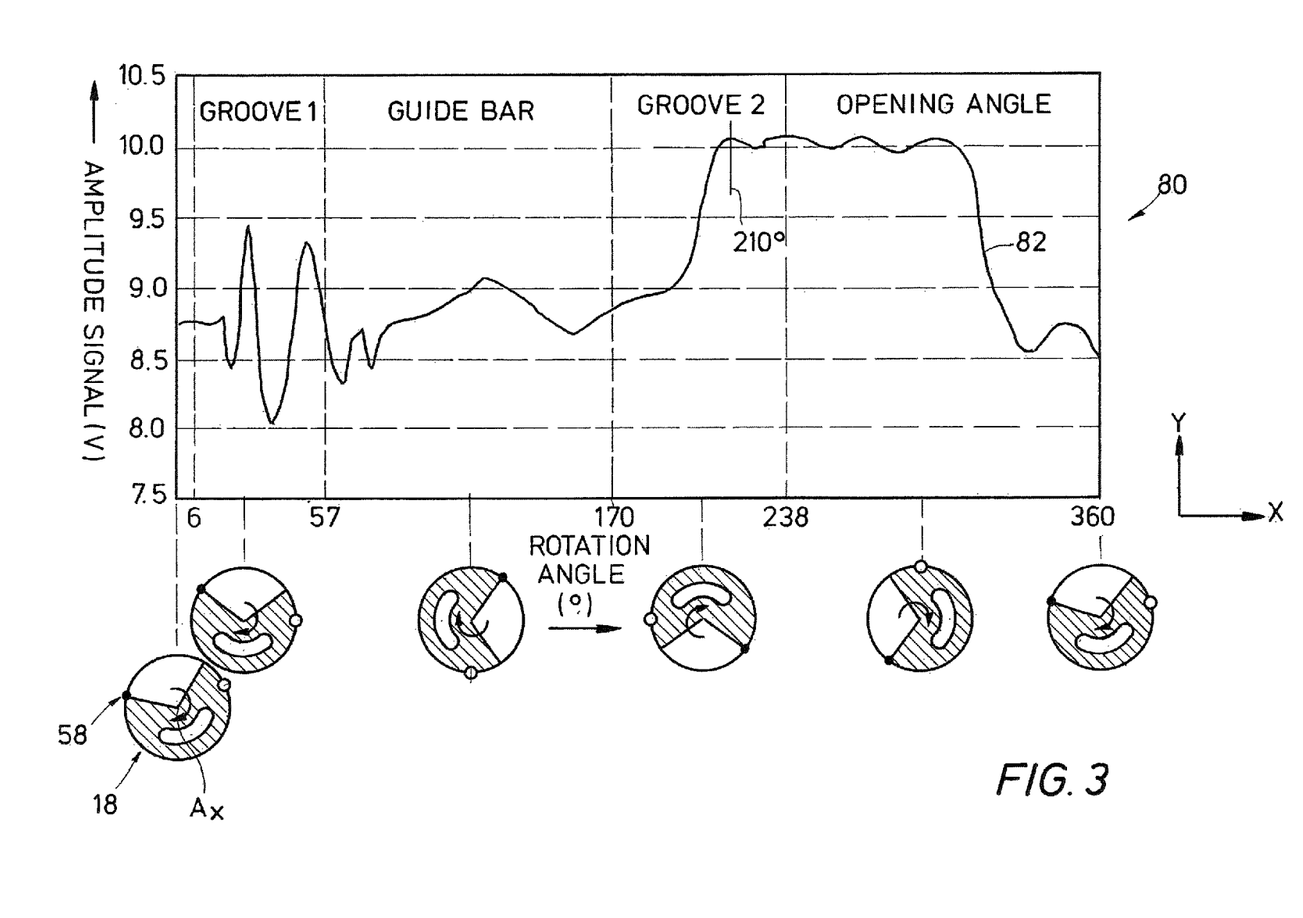
FIG. 3 is an example of a graph with a plot of drill angle vs. a measured acoustic signal in accordance with the present invention.

In addition to acoustic signals generated by the transmitter 40, acoustic signals may be generated by transmitter 40 that reflect from the drill head 18. Reflected signals recorded by the receiver 42 correlate to azimuthal orientation of the drill head 18 within the workpiece 14. Thus in one example, the receiver 42 (or receivers 42), receive signals that reflect from the wall of the bore 12 and also from the drill head 18. More specifically, referring now to FIG. 3, an exemplary graph 80 is shown that includes a plot 82 that correlates measured voltage V with rotational angle of the drill head 18 within workpiece 14. Examples of creating the plot 82 include placing a drill head 18 in a bore, generating a signal with the transmitter 40, measuring signals that reflect from the drill head 18 with the receiver 42, manually rotating the drill 16 so the drill head 18 is at a different azimuthal angle in the bore 12, and repeating the steps of transmitting and receiving acoustic signals. Exemplary angles of rotation between successive acoustic measurements can be at around 1 degree of rotation. Optionally, the plot 82 can be created while the drill 16 is in use and actively boring in the workpiece 14. For reference purposes, a cross section of drill head 18 is positioned at various locations along the graph 80 to represent azimuthal orientation of the drill head 18 of the example of FIG. 2 when at the designated rotation angle. More specifically, when at about a 0 degree rotational angle, the drill head 18 is oriented in the bore 12 so that cutting edge 58 is at a location closest to the outer periphery of workpiece 14, and when the drill head 18 is at about a 214 degree rotational angle, the cutting edge 58 is in the bore 12 at a location distal from the outer periphery of workpiece 14. In an example, assuming an axis $A_X$ of the drill head 18 as an origin in the standard X/Y plot, the cutting edge 58 at 0 degree angle (graph 80) with respect to the receiver 42 would be oriented at about 180 degrees on the X/Y plot. Still referring to FIG. 3, the plot 82 has a contour that is unique and with distinctive values with respect to the rotational angle of the drill head 18. As such, by monitoring the acoustic signal reflected from the drill head 18 within the bore 12 at discreet time periods, azimuthal orientation of the drill head 18 can be estimated based on an analysis of the plot 82.

As is known, the path of a rotating drill through a workpiece 14 can be redirected in a radial direction by applying an axial force onto the drill 16. Axial forces applied to a base of the drill 16 can cause a buckling within the drill tube 20, or other portions of the drill 16, that in turn adjusts the direction of the drill 20 through the workpiece 14. The path at which the drill head 18 is redirected is dependent upon the azimuthal orientation of drill head 18 at the time the axial pulse is delivered to the drill 16. Thus, strategically applying the impulse force onto the drill 16 when the drill 18 is at a particular azimuth, can redirect the drill 16 along the desired path so that the drill 16 can form a bore 12 with a minimal deviation from center line, or along a desired designated path. It is believed that it is within the capabilities of those skilled in the art to determine how to steer a drill through a workpiece by strategically pulsing the drill when the drill head is at a particular azimuthal orientation. One example of strategic pulsing can be found in U.S. Patent Application Publication No. 2007/0172323. Moreover, the steering or path adjustment of the drill described herein takes place in a controlled manner due to the ability to pulse a measured and discreet force onto the drill at specific and defined time and time period. A controlled steering or adjustment yields predictable results of drill path.

Figure 4:
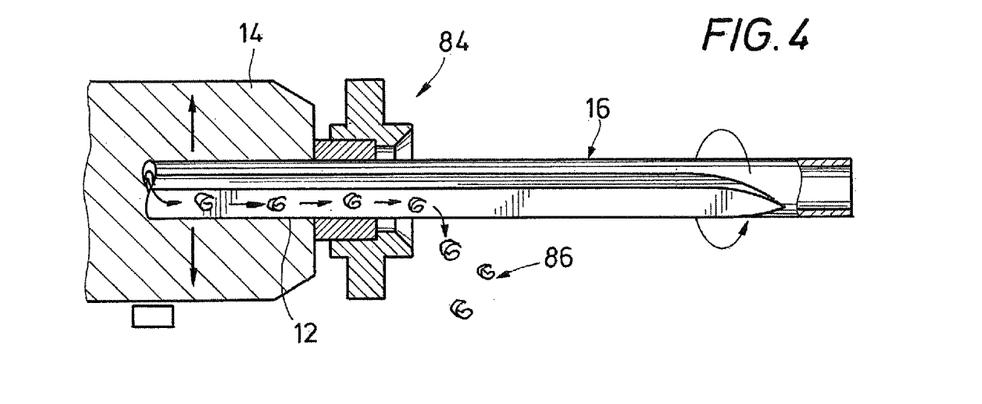
FIG. 4 is a side partial sectional view of a portion of an alternate embodiment of the drilling system of FIG. 1 in accordance with the present invention.

FIG. 4 shows in a side sectional view one optional embodiment of a drill 16 through a workpiece 14, where a drill bush 84 is mounted on an end of the workpiece 14. In the example of FIG. 4, the drill bush 84 provides a stabilizing and directional force onto the drill 16 for maintaining a designated path of the bore 12 through the workpiece 14. Further in example of FIG. 4, cuttings 86 are shown traveling axially along the drill and along the fluted portion before being exited from the drill 16 once outside of the drill bush 84.

As noted above, actuators 36 may be made from piezoelectric stacks that when energized can axially expand. Axially expanding actuators 36 can provide the impulse force onto the drill 16 for redirecting the drill and along its designated path. Thus, the control feedback from receiver 42 through processor 44 and onto actuator 36 can be completed so axial impulse forces are applied to the drill 16 at times that coincide with the designated azimuth of the drill head 18.

Figure 5:
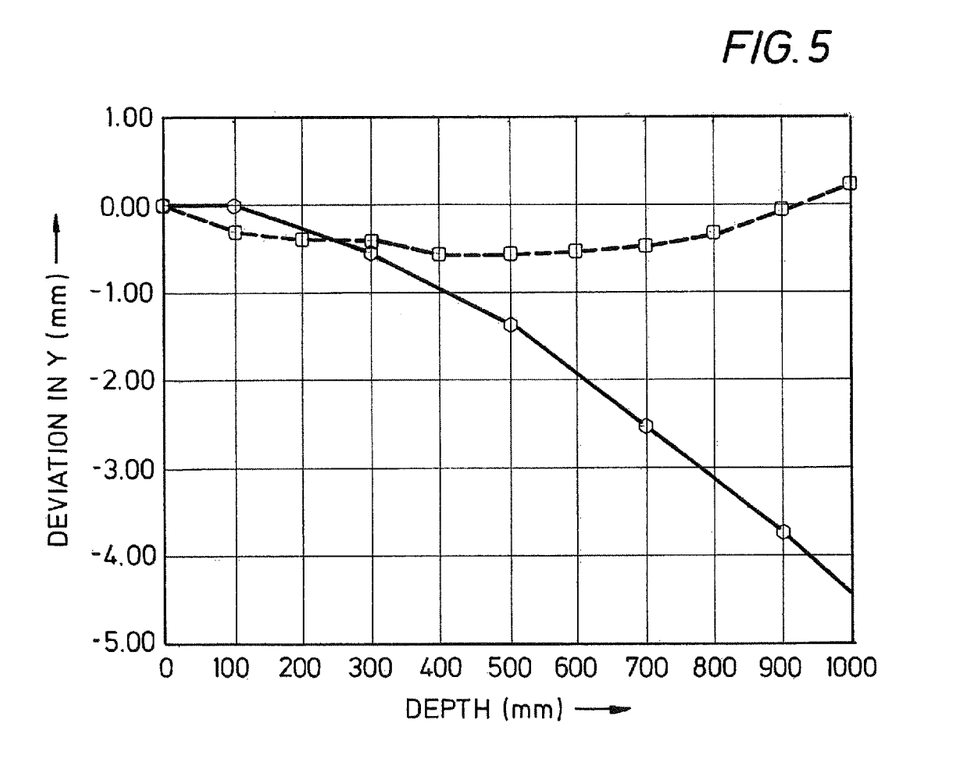
FIG. 5 is an example embodiment of a graph with plots of bore centerline deviation, with and without steering a drill, in accordance with the present invention.

FIG. 5 provide a graph 88 that includes a plot 90 that illustrates how a bore through a work piece can deviate in a vertical or radial direction with respect to lengthwise or axial direction through the work piece. In the example of FIG. 5, the deviation approaches a exponential curve that ultimately is almost 4 and ½ millimeters offset from a center line after a thousand millimeters of axial travel. In contrast, plot 92 illustrates one example embodiment implementing the system and method described herein, wherein corrective action may be taken to readjust drill path through a work piece. In this example, center line deviation is held below one millimeter and at the end of the thousand millimeter travel, is approximately at 0.1 millimeter center line deviation. As such, significant advantages of reductions in center line deviation can be achieved with implementation of the system and method described herein.

Figure 6:
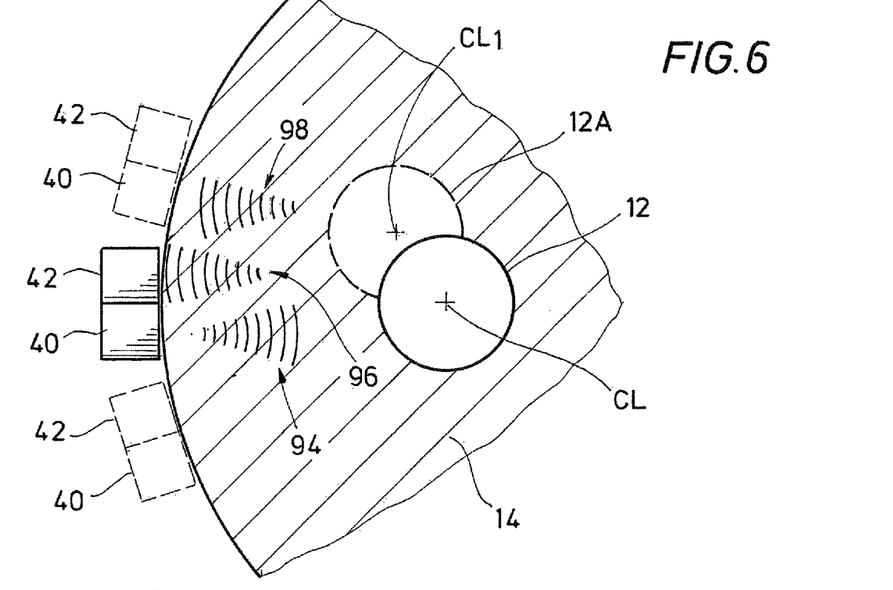
FIG. 6 is an axial sectional view of an offset bore and designated bore in the workpiece of FIG. 1, in accordance with the present invention.

Referring now to FIG. 6, in one non-limiting example of use, acoustic signals 94 are generated by the transmitter 40 that reflect from a wall of the bore 12 to form reflected signals 96. The reflected signals 96 are received by receiver 42, and used to estimate a distance r(L) between the wall of the bore 12 and outer surface of the workpiece 14. In one exemplary embodiment, distance r(L) is the shortest distance between the outer surface of the workpiece 14 and wall of bore 12; which can be measured by moving the transmitter 40/receiver 42 along the circumference of the workpiece 14 (as indicated by the transmitter 40/receiver 42 shown in dashed outline) or implementing multiple transmitters and/or receivers. In one optional embodiment, a single transmitter is used in conjunction with multiple receivers. This estimation provides a value for the location of the centerline CL of the bore 12 being formed with the drill 16 and whether or not centerline CL is deviating from a designated or desired path. In the example of FIG. 6, bore 12 is at a designated or desired location in the workpiece 14. Further shown in the embodiment of FIG. 6 is bore 12A, which is an example of the drill 16 deviating from its projected path so that bore 12A has a centerline $CL_1$ that is offset radially and angularly from centerline CL. With knowledge that the bore 12A being formed with drill 16 is deviating from a projected path, and also knowing the location of the offset centerline $CL_1$, a direction and distance to steer drill 16 and/or readjust direction of drill 16, can be estimated so that drill 16 can form a bore 12 to be at its designated or desired path. As discussed above, drill 16 can be steered or directionally readjusted by axially pulsing the drill 16 when drill head 18 is at a particular azimuthal orientation. Signals 98 represent signals generated by the cutting action of the drill head 18 and discussed above with regard to FIG. 3, and which can be monitored to estimate the azimuthal orientation of drill head 18 with respect to time. Thus knowing the azimuthal orientation of drill head 18 over time, a pulse can be strategically delivered to the drill 16 at a designated time when the drill head 18 is at a particular azimuthal orientation. The timed pulse can redirect the drill head 18 so the actual bore created by drill 16 substantially coincides with bore 12 rather than bore 12A. An advantage of monitoring azimuthal orientation of the drill head 18 in the bottom of the bore 12 rather than where the drill 16 enters the bore 12 is that twisting of the drill 16 can cause an angular offset along a length of the drill 16. Thus more accurate results are attainable with the present method.

Monitoring an azimuthal orientation of the drill head 18 can suggest what operating parameters can be adjusted for optimizing a drilling process. Exemplary parameters include an axial force on the drill, either continuous or periodic, drill revolutions per minute, type of drilling fluid, pressure of drilling fluid, drill feed rate, temperature of drilling fluid, drill material, and drill type, to name but a few. In an example, a drill slip stick condition can be identified by methods described herein, and corrective action, such as adjusting rpm of the drill, can be taken. The method described herein can be used for drills having lengths up to several yards, thus having a length to diameter ratio in excess of around 600. Drills of this length can experience significant twisting along their shaft lengths when creating a bore through a workpiece. The twisting can result in the drill tip having an azimuthal orientation many degrees different from an azimuthal orientation of portions of the drill distal from the drill tip.

Figure 7A:
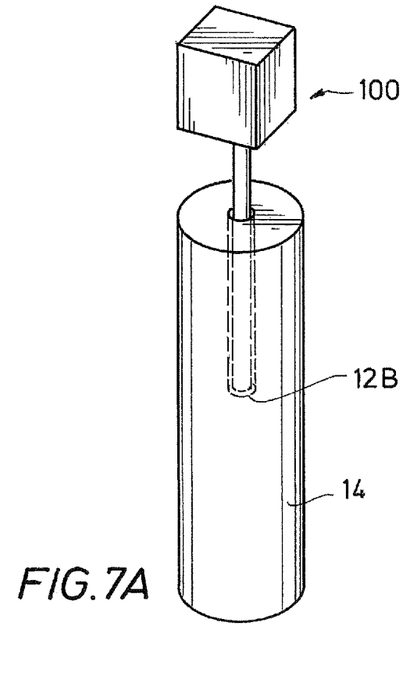
FIGS. 7A and 7B are schematic examples of using an electrical discharge machine and gun drill to form a bore in the workpiece of FIG. 1, in accordance with the present invention.
Figure 7B:
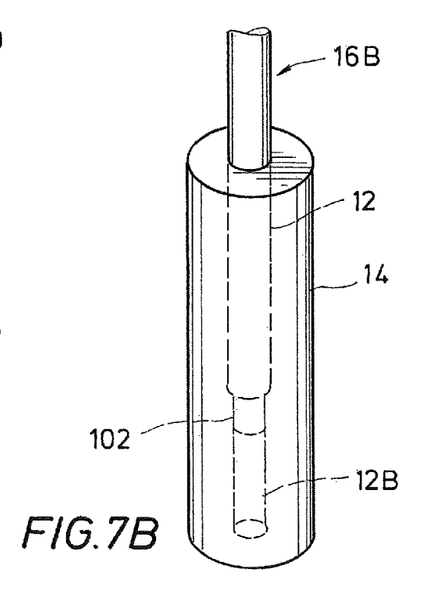

FIG. 7A provides a schematic alternate embodiment of boring through the workpiece 14, wherein an electronic discharge machine (EDM) 100 is used to create an initial or pilot bore 12B through the workpiece 14. In this example, a probe or electrode projects from the EDM 100 into the workpiece 14 to form the pilot bore 12B, wherein the pilot bore 12B has an axis that extends substantially along the same line as an axis of a projected or desired bore 12. As shown in a perspective view in FIG. 7B, after creating the pilot bore 12B with the EDM 100, a typical gun drilling procedure may be used to form bore 12. In this example a drill 16B with a guide tip 102 on its lower end inserts into the pilot bore 12B to guide the main body of the drill 16B downward in the workpiece 14 so that the ensuing bore 12 is substantially aligned with its projected orientation. Optionally, after forming the pilot bore 12B with the EDM 100, the method described above can be utilized for creating a bore 12 having a designated diameter through the workpiece 14.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. Other methods envisioned for use in measuring azimuthal orientation of the drill head include magnetic techniques and measuring acoustic signals generated by the drill boring in the workpiece. These and other similar modifications will readily suggest themselves to those skilled in the art, and are intended to be encompassed within the spirit of the present invention disclosed herein and the scope of the appended claims.

What is claimed is:

1. A method of controlling a rotating drill in a bore in a workpiece comprising:
   a. contacting a drill head of the drill with the workpiece to form a bore in the workpiece;
   b. monitoring an azimuthal orientation of the drill head in the workpiece by measuring a signal from the drill head in the bore with an acoustic sensor that is disposed adjacent an outer surface of the workpiece and that is set radially back from the bore; and
   c. adjusting an operating parameter of the drill based on the step of monitoring the azimuthal orientation.

2. The method of claim 1, further comprising monitoring a location of the bore in the workpiece by moving the acoustic sensor axially along the outer surface of the workpiece at a rate substantially the same as a penetration rate of the drill in the workpiece so that the acoustic sensor is at about the same axial location along the workpiece as the drill head.

3. The method of claim 1, wherein the acoustic sensor comprises an acoustic transmitter and an acoustic receiver.

4. The method of claim 1, monitoring a distance between the outer surface of the workpiece and bore to ensure the bore is extending along a designated path through the workpiece.

5. The method of claim 2, wherein the step of monitoring a location of the bore in the workpiece comprises emitting an acoustic signal at an axial location in the workpiece that substantially coincides with the bottom of the bore, and at varying peripheral positions on the workpiece, so that the acoustic signal travels a minimum distance through the workpiece to the bore.

6. The method of claim 1, further comprising monitoring the azimuthal orientation of the drill at a location outside of the bore to define an outside azimuth, comparing the outside azimuth to the azimuthal orientation of the drill head in a bottom of the bore, and determining a twisting of the drill based on the comparison.

7. The method of claim 1, wherein the drill is a fluted drill bit having a V shaped cross section that defines a cutting edge and a trailing edge.

8. The method of claim 1, further comprising using an electrical discharge machine to form a pilot bore in the workpiece.

9. The method of claim 1, wherein adjusting an operating parameter of the drill comprises changing an operating parameter selected from the list consisting of a substantially continuously applied axial force on the drill, a revolutions per minute of the drill, a type of drilling fluid, a pressure of drilling fluid, a feed rate of the drill, a temperature of drilling fluid, a drill material, a drill type, and combinations thereof.

10. A method of controlling a drill in a workpiece comprising:
    a. rotating the drill in a bore in the workpiece and deepening the bore;
    b. monitoring an azimuthal orientation of a portion of the drill in the workpiece;

c. estimating a projected path of the bore in the workpiece by estimating a radial distance between the bore and an outer surface of the workpiece; and d. adjusting a direction of the drill through the workpiece based on steps (b) and (c) by applying a force onto the drill.

11. The method of claim 10, wherein step (b) comprises monitoring an acoustic signal reflected from a tip of the drill in the workpiece, creating a plot of the signal over time, wherein a magnitude of the signal varies with respect to azimuthal angle of the tip of the drill.

12. The method of claim 10, further comprising, (e) monitoring a location of the bore and wherein step (d) is further based on step (e).

13. The method of claim 10, further comprising providing an acoustic transmitter and receiver adjacent an outer surface of the workpiece, and maintaining the transmitter and receiver at an axial location of the workpiece that corresponds to an axial location of a bottom of the bore as the bore is being lengthened within the workpiece by the drill.

14. The method of claim 13, further comprising reciprocatingly moving the transmitter and receiver along a portion of the periphery of the workpiece.

15. The method of claim 10, further comprising monitoring an azimuthal orientation of the drill adjacent an opening of the bore at an end of the workpiece and determining an axial twisting of the drill based on the monitored azimuthal orientation of the drill adjacent an opening of the bore and the monitored azimuthal orientation of the tip of the drill.

16. A method of forming a bore in a workpiece comprising:

eroding material from the workpiece with an applied electrical current to form a pilot bore in the workpiece that is substantially coaxial with a desired bore;

enlarging the pilot bore with a drill to form a bore in the workpiece that has a diameter and axis substantially the same as the desired bore;

monitoring an azimuthal orientation of a portion of the drill proximate a bottom of the bore;

estimating a projected path of the bore in the workpiece; and adjusting a direction of the drill through the workpiece by applying an axial force onto the drill and that is based on the steps of monitoring the azimuthal orientation and estimating the projected path of the bore.

17. The method of claim 16, wherein the drill is a gun drill having a guide pin.

18. The method of claim 1, wherein the step of adjusting an operating parameter of the drill is selected from the group consisting of applying a continuous force on the drill, applying a continuous axial force on the drill, applying a periodic force onto the drill, changing drill revolutions per minute, changing a type of drilling fluid, changing a pressure of drilling fluid, changing a drill feed rate, changing a temperature of a fluid used for drilling, changing a material of the drill, changing a type of the drill, and combinations thereof.

* * * * *